United States Patent [19]

Nakamura et al.

[11] Patent Number: 5,554,403
[45] Date of Patent: Sep. 10, 1996

[54] FROZEN DOUGH CONDITIONERS

[75] Inventors: Shingo Nakamura, Joyo; Hiroyuki Nakata; Katsuko Nakamura, both of Kyoto, all of Japan

[73] Assignee: Dai-Ichi Kogyo Seiyaku Co., Ltd., Kyoto, Japan

[21] Appl. No.: 330,958

[22] Filed: Oct. 28, 1994

[30] Foreign Application Priority Data

Oct. 29, 1993 [JP] Japan .................................... 5-293940

[51] Int. Cl.⁶ .............................. A21D 2/24; A21D 2/18; A21D 2/16; A21D 10/00
[52] U.S. Cl. ........................ 426/549; 426/611; 426/658; 426/19; 426/496; 426/24
[58] Field of Search ................................. 426/549, 611, 426/658, 19, 496, 24

[56] References Cited

U.S. PATENT DOCUMENTS

| | | | |
|---|---|---|---|
| 2,634,279 | 7/1949 | Kuhot ................................... | 260/410.7 |
| 4,477,479 | 10/1984 | Jervis ..................................... | 426/549 |
| 4,600,587 | 7/1986 | Nomura et al. ........................... | 426/19 |
| 4,664,932 | 5/1987 | Yamaguchi et al. ..................... | 426/653 |
| 4,808,334 | 2/1989 | Ezaki et al. ............................. | 426/570 |
| 5,262,182 | 11/1993 | Kasahara et al. ........................ | 426/19 |

*Primary Examiner*—Esther M. Kepplinger
*Assistant Examiner*—Choon P. Koh
*Attorney, Agent, or Firm*—Marshall, O'Toole, Gerstein, Murray & Borun

[57] ABSTRACT

A frozen dough conditioner for preventing freezing damage, such as reduced loaf volume of bread and deteriorated texture and taste, on the frozen dough caused in freezing and thawing processes. Preferably, the conditioner composition is in the form of a powdery or granule conditioner for admixture with a dough composition to be frozen. The composition preferably is prepared by spraying and drying an aqueous solution or dispersion having a pH of about 4 to about 9, wherein the aqueous solution or dispersion contains: (A) a sucrose fatty acid ester having an HLB of not less than about 5; (B) diacetyl tartaric acid monoglyceride; (C) a fatty acid monoglyceride; and (D) one or more sugars.

20 Claims, No Drawings

FROZEN DOUGH CONDITIONERS

FIELD OF THE INVENTION

The present invention relates to a frozen dough conditioner for preventing the freezing damage on the frozen dough caused in freezing and thawing processes.

BACKGROUND OF THE INVENTION AND PRIOR ART

Frozen dough has been in high demand with a shortage of employees and reduced working hours in the bread baking industry and with needs of consumers for fresh-baked bread.

The freezing and thawing processes cause freezing damage to dough and bread, such as reduced volume of bread, and deteriorated texture and taste in bread baked from previously frozen and thawed dough. In order to find countermeasures against the freezing damage, various studies, including development of freeze-resistant yeast, have been undertaken. Since there is some doubt about the safety of incorporating potassium bromate in the dough, which has been used as a dough conditioner composition, L-ascorbic acid and other compounds are currently used as conditioners, though they do not provide sufficient freezing damage resistance. The newly developed conditioners are applied only to pastries having relatively high freezing resistance, such as Danish pastries. These conditioners cannot be used for breads having a lean composition, like French bread, since such breads have short shelf life and extremely low freezing resistance.

Edible emulsifiers are known to have conditioning effects for bread dough. The emulsifiers improve the properties of dispersing and swelling of fats, oils, and other ingredients, and have appreciable interactions with lipids, starch, and proteins, thereby exerting the conditioning effects in each process of bread-making. More concretely, emulsifiers improve the machine-resistance of the dough; increase the loaf volume of bread; and prevent excessive pores caused by freezing, thus functioning to provide baked bread of fine texture and good taste. The emulsifiers also improve shelf life.

However, the emulsifiers conventionally used should be preheated, prior to dispersing or dissolving in water, to provide any effect in freeze damage-resistance. This requires time and labor and, nevertheless, the conventional emulsifiers do not have sufficient conditioning or freeze damage-resistance effects.

SUMMARY OF THE INVENTION

An object of the present invention is to provide a conditioner for frozen dough capable of minimizing or preventing the freezing damage on a frozen baking dough, commonly caused in dough freezing and thawing processes.

As a result of extensive studies, the inventors have found a frozen dough conditioner prepared by drying, particularly spraying and drying, a conditioner composition comprising specific edible emulsifiers and sugars. The invention is directed to a powdery or granular conditioner for frozen dough. The preferred conditioner is prepared by spraying and drying an aqueous solution or dispersion, having a pH of about 4 to about 9, wherein the aqueous solution or dispersion contains: (A) a sucrose fatty acid ester having an HLB of not less than about 5; (B) diacetyl tartaric acid monoglyceride; (C) a fatty acid monoglyceride; and (D) one or more sugars.

The sucrose fatty acid ester used in the dough conditioner composition has an HLB of not less than about 5 and is prepared from one or an admixture of fatty acids selected from saturated and unsaturated fatty acids containing about 12 to about 22 carbon atoms. The sucrose fatty acid ester, having an HLB of less than about 5, if used alone, results in unfavorably hardened bread of reduced volume.

The fatty acid monoglyceride may be a distillate or non-distillate obtained from natural fats and oils, such as beef tallow and cottonseed oil, or may be prepared from one or an admixture of fatty acids selected from saturated and unsaturated fatty acids containing about 12 to about 22 carbon atoms.

Examples of the sugar(s) incorporated into the dough conditioner composition of the present invention includes monosaccharides, such as fructose and glucose; disaccharides, such as sucrose and lactose; polysaccharides; such as dextrin; and sugar alcohols, such as sorbitol and/or maltitol. The sugar may be used alone or in admixture of two or more sugars.

The dough conditioning composition of the present invention preferably is a combination of a sucrose fatty acid ester, having an HLB of not less than about 5, in an amount of about 0.5% to about 90% by weight of the composition; diacetyl tartaric acid monoglyceride, in an amount of about 0.5% to about 90% by weight of the composition; a fatty acid monoglyceride, in an amount of about 0.5% to about 90% by weight of the composition; and sugar, in an amount of about 5% to about 95%, by weight of the composition. More preferably, the composition includes a combination of a sucrose fatty acid ester, having an HLB of not less than about 5, in an amount of about 1% to about 40% by weight of the composition; diacetyl tartaric acid monoglyceride, in an amount of about 1% to about 40% by weight of the composition; a fatty acid monoglyceride, in an amount of about 1% to about 40% by weight of the composition; and sugar, in an amount of about 40% to about 90%, by weight of the composition.

The four conditioning composition ingredients are dissolved or dispersed in water to provide an aqueous solution or dispersion prior to mixing into the dough composition. Since diacetyl tartaric acid monoglyceride has a relatively low pH and low stability and the sucrose fatty acid ester may be coagulated at a pH of less than about 4, the pH of the aqueous solution or dispersion should be adjusted to about 4 to about 9. A pH of greater than about 9 is also unfavorable since, at such a pH, the sucrose fatty acid ester decomposes. Adjustment of the pH of the aqueous conditioner composition to within the above range stabilizes the diacetyl tartaric acid monoglyceride (partly forms a salt), and the sucrose fatty acid ester, and thereby enhances the conditioning effects of the composition. Sodium hydroxide, potassium hydroxide, or magnesium hydroxide are examples of alkalis useful to adjust the pH of the aqueous conditioner composition.

The aqueous solution or dispersion adjusted to the pH range of about 4 to about 9 then is dried to form a powdery of granular material, and pulverized, if desired, to provide a dry conditioner composition. Preferably, the aqueous composition is spray-dried.

The amount of the conditioner of the invention to be added to the dough is generally in an amount of about 0.1% to about 5% by weight, based on the weight of the flour in the dough composition. Addition of the conditioner at a concentration of less than about 0.1% does not exert sufficient freeze damage-resistance effects, while an amount greater than about 5% does not add any further freeze damage-resistance effects and is, thus, uneconomical.

The hydrophilic sucrose fatty acid ester having a high HLB of not less than about 5 is soluble in water and, preferably, has dispersibility and solubility in water used in the bread-baking process, thus being favorably dispersed in the dough. Diacetyl tartaric acid monoglyceride improves the machine-resistance of the dough in the dough kneading step, and increases the loaf volume of the resulting bread. The fatty acid monoglyceride improves the softness of texture of bread crumbs and improves shelf life. The powdery or granular conditioner prepared by spraying and drying the aqueous solution or dispersion has effects superior to a dried composition prepared by simply mixing the powdery ingredients of the conditioner composition.

In spite of the powdery or granular dried form of the conditioner composition, the conditioner composition of the present invention is easily dispersed or dissolved in cold water, and preheating is not required prior to dispersion or dissolution in water. The powdery or granular conditioner composition of the present invention provides sufficient freeze damage-resistance when admixed with flour and other bread or pastry dough components.

The aqueous solution or dispersion prepared by dissolving or dispersing the powdery or granular conditioner composition of the present invention may also be used as a conditioner.

The conditioner composition for frozen dough, according to the present invention, effectively prevents or substantially reduces freezing damage, such as reduced loaf volume of bread and deteriorated texture and taste, on the frozen dough otherwise caused in dough freezing and thawing processes.

DESCRIPTION OF THE PREFERRED EMBODIMENT

Bread having the composition specified in Table 1 was baked according to the following process. In the description below, the term "parts" represents "parts by weight".

TABLE 1

| COMPOSITION | |
|---|---|
| INGREDIENTS | RELATIVE AMOUNTS (PARTS) |
| Strong Flour (High protein content flour) | 100 |
| Sugar | 5 |
| Salt | 2 |
| Shortening | 5 |
| Yeast | 5 |
| Ascorbic Acid | 0.01 |
| Water | 60 |

Process of Bread-Baking

Straight Dough Method (1) Knead a total of approximately 5 kilograms of all the ingredients specified in Table 1, except shortening (and, if necessary, conditioner) with a blender (about 2 minutes at low speed and about 3 minutes at intermediate speed: kneading temperature: 18° C.).

(2) Knead the dough more after adding the shortening (about 1 minute at low speed and about 6 minutes at intermediate speed: kneading temperature: about 22° C. to about 23° C.).

(3) Ferment the dough at about 23° C. for about 20 minutes.

(4) Divide the dough into 200 gram-portions and ferment for about 15 minutes.

(5) Place the dough in a mold.

(6) Freeze the dough in a freezer at about −30° C. until the core temperature of the dough reaches about −5° C. to about −6° C. Preserve the dough in a freezer at about −18° C.

(7) After freezing, thaw the dough in a retarder at about −2° C. for about 15 to 20 hours and then keep the dough at ambient temperature for about 30 minutes. Place the dough in a fermentation cabinet (at about 32° C. and about 80% relative humidity).

(8) Measure a time period in which the fermented dough rises to a predetermined height, as a final proofing time. Bake the bread in the oven at about 205° C. for about 20 minutes.

For the composition specified in Table 1, the conditioner is not specified therein since the amount of the conditioner to be added is different in each example.

As for the compositions of Tables 4, 6, and 8, the part of the conditioner is specified therein, since the part of the conditioner to be added is fixed.

EXAMPLE 1

A mixture of 3.5 parts of a sucrose fatty acid ester (HLB 11), 1.75 parts of diacetyl tartaric acid monoglyceride, 1.75 parts of stearic acid monoglyceride (monostearin), and 28 parts of dextrin was dispersed and dissolved in 65 parts of water, with heating, and the composition was adjusted to pH 6 with sodium hydroxide. A powdery conditioner was prepared by spraying and drying the aqueous solution at 150° C. In a commercially viable operation, the aqueous solution of the conditioner was dropped onto an atomizer (disk) rotated at approximately 10,000 rpm to generate a mist. A hot blast of 150° C. was supplied to a dryer in the same direction as the atomized aqueous solution supplied to the dryer. The powdery conditioner thus prepared was added to the bread composition specified in Table 1. The powdery conditioner is mixed with strong flour (high protein content flour) at a concentration of 2.5 parts conditioner composition per 100 parts of the powdery flour. The bread obtained is provided for the bread-baking test.

EXAMPLE 2

A mixture of 2.5 parts of a sucrose fatty acid ester (HLB 9.5), 2.5 parts of diacetyl tartaric acid monoglyceride, 2.5 parts of stearic acid monoglyceride, and 17.5 parts of sucrose was dispersed and dissolved in 75 parts of water, with heating, and adjusted to pH 6 with sodium hydroxide. A powdery conditioner was prepared in the same manner as Example 1. The powdery conditioner was added to the bread composition specified in Table 1. The powdery conditioner is mixed with strong flour at a concentration of 1.5 parts of conditioner composition per 100 parts of the powdery flour. The bread obtained is provided for the bread-baking test.

Comparative Example 1

A conditioner was prepared in the same manner as Example 1 except that a sucrose fatty acid ester of HLB 2 was used instead of the sucrose fatty acid ester of HLB 11.

Comparative Example 2

A conditioner was prepared in the same manner as Example 1 except that the pH of the aqueous solution was not adjusted (pH 2) and the powdery conditioner was prepared by spraying and drying the aqueous solution.

Comparative Example 3

A conditioner was prepared in the same manner as Example 2 except that a sucrose fatty acid ester of HLB 2 was used instead of the sucrose fatty acid ester of HLB 9.5.

Table 2 shows the results of the bread-baking test for Examples 1 and 2 and Comparative Examples 1 through 3. The terms "1-week freezing" and "4-weeks freezing" show time periods after start of preservation in a freezer at −18° C. in step (6) of the above bread-baking process. The specific volume, hardness, and taste were evaluated in the following manner.

Specific Volume

The loaf volume of bread was measured according to the method of Rapeseed Displacement described below and the specific volume was then determined with the loaf volume of bread.

Rapeseed Displacement

A vessel is completely filled with rapeseed and the volume of the rapeseed (first volume) is measured with a measuring cylinder. Baked bread is placed in the vessel and the vacancies (void spaces or pores) are filled with rapeseed. The volume of the rapeseed charged into the vacancies (second volume) is measured with the measuring cylinder. The loaf volume of bread is obtained by calculating a difference between the first volume and the second volume. The specific volume (ml/g) is then determined as: (the loaf volume of bread)/(the weight of bread).

Hardness

A slice of bread of 5 cm×5 cm×4 cm was prepared, and the hardness of the slice was measured with a rheometer under compression for 20 seconds (compression speed: 2 cm/min).

Taste

The taste of bread was evaluated by five monitors according to the following criteria:

A: Highly soft texture of crumb with good taste;
B: Soft texture of crumb with not-bad taste; and
C: Sticky texture of crumb with bad taste.

On the contrary, the breads baked using the conditioners of Examples 1 and 2 have larger loaf volumes, softer texture, and better taste than those of Comparative Examples 1 through 3.

EXAMPLE 3

A mixture of 6.3 parts of a sucrose fatty acid ester (HLB 9.5), 4.7 parts of diacetyl tartaric acid monoglyceride, 1.5 parts of stearic acid monoglyceride, and 12.5 parts of dextrin was dispersed and dissolved in 75 parts of water with heating and adjusted to pH 7 with sodium hydroxide. A powdery conditioner was prepared by spraying and drying the aqueous solution at 150° C. The powdery conditioner thus prepared was added to the bread composition specified in Table 1 at a concentration of 1 part conditioner composition to 100 parts of strong flour for the bread-baking test.

EXAMPLE 4

The powdery conditioner prepared in the same manner as Example 3 was previously dispersed and dissolved in water with heating.

Comparative Example 4

A conditioner was prepared by simply mixing the three powdery emulsifiers and dextrin used in Example 3 (no dissolution in water, no pH adjustment, and no spraying and drying). The powdery conditioner thus prepared was added to the composition specified in Table 1 at a concentration of 1 part conditioner composition to 100 parts of strong flour for the bread-baking test.

Comparative Example 5

The bread-baking test was performed without the conditioner, in the same manner as Example 3.

TABLE 2

| | | EXAMPLE 1 | EXAMPLE 2 | COMPARATIVE EXAMPLE 1 | COMPARATIVE EXAMPLE 2 | COMPARATIVE EXAMPLE 3 |
|---|---|---|---|---|---|---|
| HLB OF SUCROSE FATTY ACID ESTER | | 11 | 9.5 | 2 | 11 | 2 |
| pH OF SOLUTION | | 6 | 6 | 6 | 2 | 6 |
| SPECIFIC VOLUME (ml/g) | NON-FREEZING | 6.9 | 6.6 | 6.5 | 6.7 | 6.3 |
| | 1-WEEK FREEZING | 6.8 | 6.5 | 6.3 | 6.5 | 6.1 |
| | 4-WEEKS FREEZING | 6.8 | 6.5 | 6.0 | 6.3 | 5.8 |
| HARDNESS ($g/cm^2$) | NON-FREEZING | 23 | 28 | 25 | 24 | 31 |
| | 1-WEEK FREEZING | 22 | 31 | 27 | 28 | 35 |
| | 4-WEEKS FREEZING | 26 | 35 | 35 | 32 | 42 |
| FINAL PROOFING TIME (min) | NON-FREEZING | 59 | 59 | 61 | 60 | 63 |
| | 1-WEEK FREEZING | 73 | 80 | 85 | 83 | 86 |
| | 4-WEEKS FREEZING | 89 | 89 | 105 | 93 | 99 |
| TASTE AFTER 4-WEEKS FREEZING | | A | A | B | B | B |

The conditioner of Comparative Examples 1 and 3 contained a sucrose fatty acid ester having an HLB of 2, while the conditioner of Comparative Example 2 had a pH of 2 in aqueous solution. As shown in Table 2, this resulted in unfavorably hardened bread of reduced loaf volume with relatively bad taste. These conditions required a relatively long time for fermentation and had low gas retention ability. A dough having a higher gas retention ability rises in a shorter fermentation time.

Comparative Example 6

The bread-baking test was performed in the same manner as Example 3 except that only stearic acid monoglyceride was added instead of the three emulsifiers. The amount of the stearic acid monoglyceride is 0.5 g stearic acid monoglyceride to 100 g of strong flour in the composition specified in Table 1.

Table 3 shows the results of the bread-baking test for Examples 3 and 4 and Comparative Examples 4 through 6.

TABLE 3

| | | EXAMPLE 3 | EXAMPLE 4 | COMPARATIVE EXAMPLE 4 | COMPARATIVE EXAMPLE 5 | COMPARATIVE EXAMPLE 6 |
|---|---|---|---|---|---|---|
| SPECIFIC VOLUME (ml/g) | NON-FREEZING | 6.6 | 6.6 | 6.4 | 6.3 | 6.4 |
| | 1-WEEK FREEZING | 6.6 | 6.5 | 6.2 | 5.8 | 6.1 |
| | 4-WEEKS FREEZING | 6.5 | 6.4 | 5.9 | 5.3 | 5.8 |
| HARDNESS $(g/cm^2)$ | NON-FREEZING | 29 | 29 | 30 | 36 | 31 |
| | 1-WEEK FREEZING | 32 | 32 | 33 | 40 | 35 |
| | 4-WEEKS FREEZING | 37 | 35 | 40 | 49 | 42 |
| FINAL PROOFING TIME (min) | NON-FREEZING | 54 | 57 | 59 | 62 | 60 |
| | 1-WEEK FREEZING | 84 | 82 | 90 | 102 | 95 |
| | 4-WEEKS FREEZING | 99 | 101 | 121 | 175 | 138 |
| TASTE AFTER 4-WEEKS FREEZING | | A | A | B | C | C |

As shown in Table 3, the conditioner of Example 4, which was previously dissolved in water, had equivalent conditioning effects to the conditioner of Example 3. Comparative Example 4, in which the ingredients of the conditioner were simply mixed, had slightly lower evaluation results. Comparative Example 6, using a small amount of stearic acid monoglyceride, had poor evaluation results.

EXAMPLE 5

The powdery conditioner of Example 3 was mixed with the ingredients specified in Table 4, and bread with wheat germ was baked for evaluation.

TABLE 4

| INGREDIENTS | RELATIVE AMOUNTS (PARTS) |
|---|---|
| Strong Flour (High protein content flour) | 90 |
| Wheat Germ | 10 |
| Sugar | 5 |
| Salt | 2 |
| Fats and Oils | 4 |
| Yeast | 5 |
| Ascorbic Acid | 0.01 |
| Water | 60 |
| Conditioner | 1 |

Bread was baked according to the straight dough method described above, and the powdery conditioner was mixed with the other powdery ingredients.

Comparative Example 7

The bread-baking test was performed, without the conditioner, in the same manner as Example 5.

Table 5 shows the results of the bread-baking test for Example 5 and Comparative Example 7.

TABLE 5

| | | EXAMPLE 5 | COMPARATIVE EXAMPLE 7 |
|---|---|---|---|
| SPECIFIC VOLUME (ml/g) | NON-FREEZING | 6.0 | 5.4 |
| | 2-WEEKS FREEZING | 5.7 | 4.7 |
| | 4-WEEKS FREEZING | 5.6 | 3.2 |
| HARDNESS $(g/cms^2)$ | NON-FREEZING | 35 | 38 |
| | 2-WEEKS FREEZING | 36 | 43 |
| | 4-WEEKS FREEZING | 45 | 130 |

As shown in Table 5, the bread of Example 5 had higher specific volume and smaller hardness than that of Comparative Example 7, which does not include any conditioners. In the above test, the time of fermentation was fixed at 40 minutes for both Example 5 and Comparative Example 7.

EXAMPLE 6

The powdery conditioner of Example 3 was mixed with the ingredients specified in Table 6, and butter rolls were baked for evaluation.

TABLE 6

| INGREDIENTS | RELATIVE AMOUNTS (PARTS) |
|---|---|
| Strong Flour (High protein content flour) | 100 |
| Egg | 15 |
| Sugar | 10 |
| Salt | 1.6 |
| Fats and Oils | 15 |
| Yeast | 3 |
| Ascorbic Acid | 0.01 |
| Water | 45 |
| Conditioner | 1 |

Bread was baked according to the straight dough method described above, and the powdery conditioner was mixed with the other powdery ingredients.

Comparative Example 8

The bread-baking test was performed without the conditioner in the same manner as Example 6.

Table 7 shows the results of the bread-baking test for Example 6 and Comparative Example 8.

TABLE 7

| | | EXAMPLE 6 | COMPARATIVE EXAMPLE 8 |
|---|---|---|---|
| SPECIFIC VOLUME (ml/g) | NON-FREEZING | 5.2 | 5.1 |
| | 2-WEEKS FREEZING | 4.8 | 3.7 |
| | 4-WEEKS FREEZING | 4.6 | 3.1 |
| HARDNESS $(g/cms^2)$ | NON-FREEZING | 67 | 89 |
| | 2-WEEKS FREEZING | 102 | 150 |
| | 4-WEEKS FREEZING | 113 | 198 |

As shown in Table 7, the bread of Example 6 had higher specific volume and lower hardness than that of Comparative Example 8, which does not include any conditioners. In the above test, the time of fermentation was fixed at 40 minutes for both Example 6 and Comparative Example 8.

EXAMPLE 7

The powdery conditioner of Example 3 was mixed with the ingredients specified in Table 8, and French bread was baked for evaluation.

TABLE 8

| INGREDIENTS | RELATIVE AMOUNTS (PARTS) |
| --- | --- |
| Strong Flour (High protein content flour) | 50 |
| Weak Flour (Low protein content flour) | 50 |
| Salt | 2 |
| Yeast | 5 |
| Ascorbic Acid | 0.01 |
| Water | 56 |
| Conditioner | 1 |

Bread was baked according to the straight dough method described above, and the powdery conditioner was mixed with the other powdery ingredients.

Comparative Example 9

The bread-baking test was performed, without the conditioner, in the same manner as Example 7.

Table 9 shows the results of the bread-baking test for Example 7 and Comparative Example 9.

TABLE 9

| | | EXAMPLE 7 | COMPARATIVE EXAMPLE 9 |
| --- | --- | --- | --- |
| SPECIFIC VOLUME (ml/g) | NON-FREEZING | 4.9 | 4.3 |
| | 2-WEEKS FREEZING | 4.6 | 3.3 |
| | 4-WEEKS FREEZING | 4.4 | 2.8 |
| HARDNESS (g/cms$^2$) | NON-FREEZING | 82 | 117 |
| | 2-WEEKS FREEZING | 106 | 249 |
| | 4-WEEKS FREEZING | 121 | 275 |

As shown in Table 9, the bread of Example 7 had higher specific volume and lower hardness than that of Comparative Example 9, which does not include any conditioners. In the above test, the time of fermentation was fixed at 40 minutes for both Example 7 and Comparative Example 9.

In any type of bread, the conditioner composition of the invention give favorable freezing resistance and improves the texture and taste of bread.

What is claimed is:

1. A conditioner composition for admixture with a bread dough to reduce freeze damage upon freezing said dough, said composition prepared by drying an aqueous solution or dispersion having pH in the range of about 4 to about 9, said aqueous solution or dispersion comprising:
    (A) a sucrose fatty acid ester having an HLB of not less than about 5;
    (B) diacetyl tartaric acid monoglyceride;
    (C) a fatty acid monoglyceride; and
    (D) sugar.

2. A conditioner composition according to claim 1, wherein said ingredient (A) is a sucrose fatty acid ester prepared from one or more fatty acids selected from the group consisting of saturated and unsaturated fatty acids containing about 12 to about 22 carbon atoms.

3. A conditioner composition according to claim 1, wherein the fatty acid monoglyceride of said ingredient (C) is a distillate from natural fats and oils.

4. A conditioner composition according to claim 1, wherein the fatty acid monoglyceride of said ingredient (C) comprises a non-distillate from natural fats and oils.

5. A conditioner composition according to claim 1, wherein said ingredient (C) comprises a fatty acid monoglyceride prepared from one or more fatty acids selected from the group consisting of saturated and unsaturated fatty acids containing about 12 to about 22 carbon atoms.

6. A conditioner composition according to claim 1, wherein said ingredient (D) is a sugar selected from the group consisting of a monosaccharide, a disaccharide, a polysaccharide, a sugar alcohol, and mixtures thereof.

7. A conditioner composition according to claim 1, wherein the amounts of said ingredients (A) through (D) are: (A) about 0.5% to about 90%; (B) about 0.5% to about 90%; (C) about 0.5% to about 90%; and (D) about 5% to about 95% by weight.

8. A conditioner composition according to claim 1, wherein the amounts of said ingredients (A) through (D) are: (A) about 1% to about 40%; (B) about 1% to about 40%; (C) about 1% to about 40%; and (D) 40% to about 90% by weight.

9. A conditioner composition according to claim 1, wherein the composition includes flour, and wherein the conditioner composition comprises about 0.1% to about 5% by weight of the flour.

10. A conditioner composition according to claim 1, wherein the composition is dried by spray-drying.

11. A conditioner composition according to claim 10, wherein the dried composition is in the form of a powder or in granular form.

12. A composition according to claim 1, wherein ingredient (D) comprises a plurality of sugars.

13. The product made by the process of claim 1.

14. A method of reducing freeze damage to a flour-containing dough comprising adding to said dough, in an amount of about 0.1% to about 5%, based on the weight of the flour in said dough, a composition prepared by drying an aqueous solution or dispersion having a pH in the range of about 4 to about 9, said aqueous solution or dispersion comprising:
    (A) a sucrose fatty acid ester having an HLB of not less than about 5;
    (B) diacetyl tartaric acid monoglyceride;
    (C) a fatty acid monoglyceride; and
    (D) sugar.

15. A method according to claim 14, wherein said ingredient (A) is a sucrose fatty acid ester prepared from one or more fatty acids selected from the group consisting of saturated and unsaturated fatty acids containing about 12 to about 22 carbon atoms.

16. A method according to claim 14, wherein said ingredient (C) comprises a fatty acid monoglyceride prepared from one or more fatty acids selected from the group consisting of saturated and unsaturated fatty acids containing about 12 to about 22 carbon atoms.

17. A method according to claim 14, wherein said ingredient (D) is a sugar selected from the group consisting of a monosaccharide, a disaccharide, a polysaccharide, a sugar alcohol, and mixtures thereof.

18. A method according to claim 14, wherein the amounts of said ingredients (A) through (D) are: (A) about 0.5% to about 90%; (B) about 0.5% to about 90%; (C) about 0.5% to about 90%; and (D) about 5% to about 95% by weight.

19. A method according to claim 14, wherein the amounts of said ingredients (A) through (D) are: (A) about 1% to about 40%; (B) about 1% to about 40%; (C) about 1% to about 40%; and (D) 40% to about 90% by weight.

20. A method according to claim 14, wherein the composition is dried by spray-drying.

* * * * *